March 18, 1924.
A. B. HUSELTON
ANTISKID DEVICE
1,487,572
Filed March 20, 1923
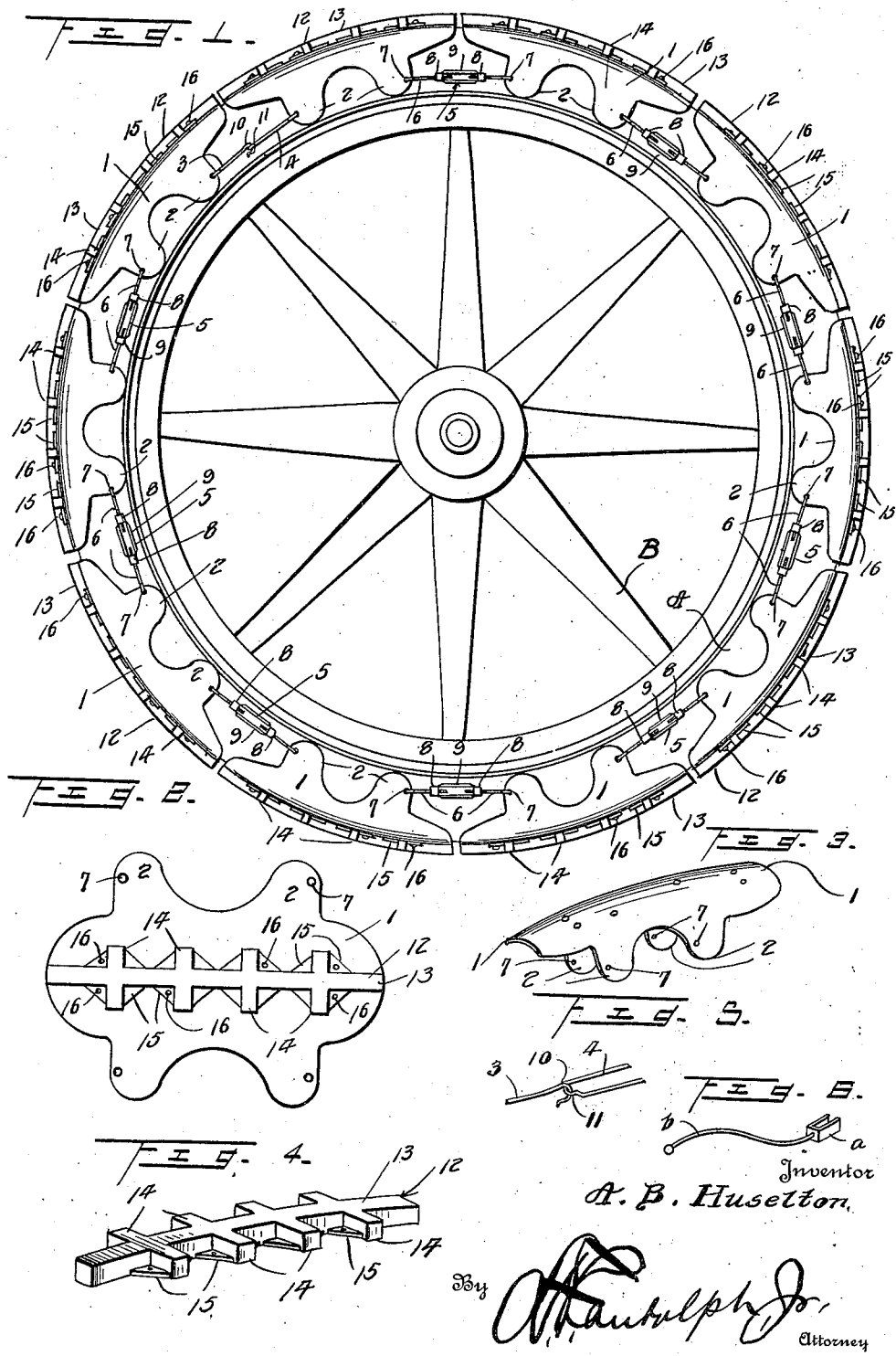
Inventor
A. B. Huselton,
By
Attorney Patented Mar. 18, 1924.

1,487,572

UNITED STATES PATENT OFFICE.

ALLEN B. HUSELTON, OF BUTLER, PENNSYLVANIA.

ANTISKID DEVICE.

Application filed March 20, 1923. Serial No. 626,343.

*To all whom it may concern:*

Be it known that I, ALLEN B. HUSELTON, a citizen of the United States, residing at Butler, in the county of Butler and State of Pennsylvania, have invented certain new and useful Improvements in Antiskid Devices; and I do hereby declare the following to be a full, clear, and exact description of the invention, such as will enable others skilled in the art to which it appertains to make and use the same.

This invention relates to a traction or anti-skid device for vehicle wheels and especially those equipped with pneumatic tires.

It is aimed to provide a novel construction which will withstand maximum wear and yet afford efficient traction, and one which has adjustable means to enable it to grip tires of different sizes and also to prevent release of the fastening means.

In addition it is aimed to provide a novel construction of shoe and calk carried thereby.

Additional objects and advantages will become apparent from a consideration of the description following taken in connection with accompanying drawings illustrating an operative embodiment.

In said drawings:—

Figure 1 is a side elevation of a vehicle wheel showing the device in place;

Figure 2 is a plan view of one of the shoes,

Figure 3 is a perspective view of one of the shoes,

Figure 4 is a perspective view of one of the calks,

Figure 5 is a detail perspective view illustrating one of the hook and link connections, and Figure 6 is a detail perspective view of the tool preferably used to fasten and unfasten the hooks and links.

Like reference characters designate like or similar parts in the different views.

In carrying the invention into practice, any suitable number of shoes 1 are provided, for instance ten, preferably of metal, and curved longitudinally and transversely to conform to the exterior shape of a tire such as that shown at A mounted on an automobile or other vehicle wheel B. Each shoe has a pair of ears 2 at each side thereof. At 3, hooks are pivotally connected through openings in two of the ears for separable engagement with endless links pivoted in the openings of adjacent ears. Turn buckles 5 connect the remaining ears of adjacent shoes 1 together. These turn buckles are of any suitable construction for instance having bolts 6 pivotally connected in openings 7 of the ears and screw threaded for engagement with the opposite screw threads of the end portions of nuts 8 of the buckle grips or frames 9. As a result of this construction, the chain or device may be fastened about the tire A separably through engagement of the hooks 3 and 4 and the buckles 9 may be adjusted in order to cause the shoes to tightly grip the tire and adapt itself to the tire and also to prevent accidental detachment of the hooks 3 and links 4. The bills of the hooks 3 are shown at 10 and the links 4 may be offset at 11 to accommodate them. If desired, a suitable tool may be used to facilitate the fastening and unfastening of the hooks 3 with links 4. Such a tool is detailed in Figure 6, and as there shown comprises a fork *a* and a handle *b* rigid therewith. In removing a chain from a tire, the tool is used to loosen the chain about the tire, by employing the tool as a wrench in the operation of the turn buckles 5. The turn buckles being loosened, the hooks 3 may be readily disconnected from the links 4. In applying the chain to a tire casing, the operation is reverse and the hooks 3 are engaged with the links 4 and the turn buckles are then tightened, using the implement shown in Figure 6, in order to obtain a leverage.

Calks or traction devices, preferably metallic, and capable of being cast in a single piece, are shown at 12. These calks consist of longitudinal bars 13 having transverse branches 14 at suitable intervals. At the junctions or corners of the bars 13 and branches 14, webs 15 are provided to reinforce the calks and also form a fastening means. These webs 15 are of considerably less thickness than the bars 13 and branches 14. Rivets or other fastenings 16 may be passed through certain of the webs 15 and shoes 1 in order to secure them together. At least six rivets are usually used for each calk and shoe.

As the calks may be readily cast in a single piece, they are inexpensive and in addition their form affords considerable traction and they are generally reinforced by the webs 15 which function also as fastening means. The rivets may be readily removed in order to accommodate the substitution of new calks and rivets whenever desired.

The shoes for example may be made from malleable iron while the calks are adapted to be cast from steel.

As merely one operative embodiment has been illustrated and described, it is to be understood that changes in the details may be resorted to provided they fall within the spirit and scope of the invention.

I claim as my invention:—

1. A traction device adapted to surround a wheel including shoes, each shoe having a pair of ears at each side thereof, hooks in certain of said ears, loops separately engageable by said hooks carried by certain other ears, and the remaining ears being joined by turn buckles, said turn buckles being operable to contract the device to fit a tire and to prevent disengagement of said hooks and loops.

2. A traction device including a shoe for application against a tire, a calk on said shoe, said calk having a main bar and branches extending therefrom, webs integral with the main bar and branches, and fastening means passing through the webs and the shoe.

In testimony whereof I affix my signature in presence of two witnesses.

ALLEN B. HUSELTON.

Witnesses:
THEO C. KEARNS,
J. S. BUKOVACKY.